United States Patent
Divakaran et al.

(10) Patent No.: US 7,349,477 B2
(45) Date of Patent: Mar. 25, 2008

(54) AUDIO-ASSISTED VIDEO SEGMENTATION AND SUMMARIZATION

(75) Inventors: Ajay Divakaran, Denville, NJ (US); Regunathan Radhakrishnan, Edison, NJ (US); Michael A. Casey, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 567 days.

(21) Appl. No.: 10/192,064

(22) Filed: Jul. 10, 2002

(65) Prior Publication Data

US 2004/0008789 A1     Jan. 15, 2004

(51) Int. Cl.
*H04N 7/12* (2006.01)

(52) U.S. Cl. .............................. 375/240.26

(58) Field of Classification Search ............ 382/190, 382/173, 305, 178, 260, 309, 100, 103, 107, 382/155, 162, 160, 171, 172, 228, 232, 181, 382/174; 375/240.28, 240.26, 240.01; 348/482, 348/483, 559, 143, 155, 461; 707/100
See application file for complete search history.

(56) References Cited

U.S. PATENT DOCUMENTS

| | | | |
|---|---|---|---|
| 5,664,227 A * | 9/1997 | Mauldin et al. ............ 395/778 |
| 5,953,485 A * | 9/1999 | Abecassis .................... 386/68 |
| 6,516,090 B1 * | 2/2003 | Lennon et al. .............. 382/173 |
| 6,714,909 B1 * | 3/2004 | Gibbon et al. .............. 704/246 |
| 6,741,909 B2 * | 5/2004 | Leatherman et al. ........ 700/234 |
| 6,744,922 B1 * | 6/2004 | Walker ....................... 382/190 |
| 6,748,356 B1 * | 6/2004 | Beigi et al. ................. 704/245 |
| 6,956,904 B2 * | 10/2005 | Cabasson et al. ...... 375/240.26 |
| 2003/0229629 A1 * | 12/2003 | Jasinschi et al. .............. 707/3 |
| 2004/0030550 A1 * | 2/2004 | Liu et al. .................... 704/231 |
| 2004/0125877 A1 * | 7/2004 | Chang et al. .......... 375/240.28 |
| 2005/0033760 A1 * | 2/2005 | Fuller et al. ................ 707/100 |
| 2006/0114992 A1 * | 6/2006 | Shibata et al. ......... 375/240.08 |

OTHER PUBLICATIONS

Hao Jiang, video segmentation with the assistance of audio content analysis, 2000, 1507-1510.*
Atul Puri, Mutimedia Search and Retrieval Jul. 30, 2001, 559-584.*
Sundaram, et al., "*Audio Scene Segmentation Using Multiple Features, Models and Time Scales,*" ICASSP 2000, Jun. 5-9, Istanbul, Turkey, 2000.
Wang, et al., "*Multimedia Content Analysis Using Both Audio and Visual Clues,*" IEEE Signal Processing Magazine, pp. 12-36, Nov. 2000.

* cited by examiner

*Primary Examiner*—Tung Vo
*Assistant Examiner*—Behrooz Senfi
(74) *Attorney, Agent, or Firm*—Dirk Brinkman; Clifton D. Mueller; Gene V. Vinokur

(57) ABSTRACT

A method segments a compressed video by extracting audio and visual features from the compressed video. The audio features are clustered according to K-means clustering in a set of classes, and the compressed video is then partitioned into first segments according to the set of classes. The visual features are then used to partitioning each first segment into second segments using motion analysis. Summaries of the second segments can be provided to assist in the browsing of the compressed video.

10 Claims, 1 Drawing Sheet

US 7,349,477 B2

AUDIO-ASSISTED VIDEO SEGMENTATION AND SUMMARIZATION

FIELD OF THE INVENTION

The present invention relates generally to browsing videos, and more particularly to browsing videos using visual and audio features.

BACKGROUND OF THE INVENTION

The amount of entertainment, information, and news that is available on videos is rapidly increasing. Therefore, there is a need for efficient video browsing techniques. Generally, video can include three "tracks" that could be used for browsing, visual, audio, and textual (close-captions).

Most videos have story or topic structures, which are reflected in the visual track. The fundamental unit of the visual track is a shot or scene, which captures continuous action. Therefore, many video browsers expect that the video is first partitioned into story or topic segments. Scene change detection, also called temporal segmentation, indicates when a shot starts and ends. Scene detection can be done with DCT coefficient in the compressed domain. Frames can then be selected from the segments to form a summary of the video, which can then be browsed rapidly, and used as an index into the entire video. However, video summaries do not provide any information about the content that is summarized.

Another technique uses representative frames to organize the visual content of the video. However, so far, meaningful frame selection processes require manual intervention.

Another technique uses a language-based model that matches the audio track of an incoming video with expected grammatical elements of a news broadcast, and uses a priori models of the expected content of the video clip to parse the video. However, language-based models require speech recognition, which is known to be slow and error prone.

In the prior art, topic detection has been carried out using closed caption information, embedded captions and text obtained through speech recognition, by themselves or in combination with each other, see Hanjalic et al., "Dancers: Delft advanced news retrieval system," IS&T/SPIE Electronic Imaging 2001: Storage and retrieval for Media Databases, 2001, and Jasinschi et al., "Integrated multimedia processing for topic segmentation and classification," ICIP-2001, pp. 366-369, 2001. In those approaches, text is extracted from the video using some or all of the aforementioned sources and then the text is processed using various heuristics to extract the topics.

News anchor detection has been carried out using color, motion, texture and audio features. For example, one technique uses the audio track for speaker separation and the visual track to locate faces. The speaker separation first classifies audio segments into categories of speech and non-speech. The speech segments are then used to train Gaussian mixture models for each speaker, see Wang et al., "Multimedia Content Analysis," IEEE Signal Processing Magazine, November 2000.

Motion-based video browsing is also known in the prior art, see U.S. patent application Ser. No. 09/845,009 "Video Summarization Using Descriptors of Motion Activity" filed by Divakaran et al. on Apr. 27, 2001, incorporated herein by reference. That system is efficient because it relies on simple computation in the compressed domain. Thus, that system can be used to rapidly generate a visual summaries of a video. However, to use for news video browsing, that method requires a topic list. If the topic list is not available, then the video may be segmented that in some way that is inconsistent with semantics of the content.

Of special interest to the present invention is using sound recognition for video browsing. For example, in videos, it may be desired to identify the most frequent speakers, the principal cast, or news "anchors." If this could be done for a video of news broadcasts, for example, it would be possible to locate the beginning of each topic or "story" covered by the news video. Thus, it would be possible to skim rapidly through the video, only playing back a small portion starting where one of the news anchors begins to speak.

Because news videos are typically arranged topic-wise in segments and the news anchor introduces each topic at the beginning of each segment, prior art news video browsing work has emphasized news anchor detection and topic detection. Thus, by knowing the topic boundaries, the user can skim through the news video from topic to topic until the desired topic is located, and then the desired topic can be viewed in its entirety.

Therefore, it is still desired to use the audio track during for video browsing. However, as stated above, speech recognition is time consuming and error prone. Unlike speech recognition, which deals primarily with the specific problem of recognizing spoken words, sound recognition deals with the more general problem of characterizing and identifying audio signals, for example, animal sounds, different genres of music, musical instruments, natural sounds such as the rustling of leaves, glass breaking, or the crackling of a fire, animal sounds such as dogs barking, as well as human speech—adult, child, male or female. Sound recognition is not concerned with deciphering the content, but rather with characterizing the content.

One sound recognition system is described by Casey, in "MPEG-7 Sound-Recognition Tools," IEEE Transactions on Circuits and Systems for Video Technology, Vol. 11, No. 6, June 2001, and U.S. Pat. No. 6,321,200, issued to Casey on Nov. 20, 2001, "Method for extracting features from a mixture of signals." Casey uses reduced rank spectra of the audio signal and minimum-entropy priors. As an advantage, the Casey method allows one to annotate an MPEG-7 video with audio descriptors that are easy to analyze and detect, see "Multimedia Content Description Interface," of "MPEG-7 Context, Objectives and Technical Roadmap," ISO/IEC N2861, July 1999. Note that Casey's method involves both classification of a sound into a category as well as generation of a corresponding feature vector.

SUMMARY OF THE INVENTION

A method segments a compressed video by extracting audio and visual features from the compressed video. The audio features are clustered according to K-means clustering in a set of classes, and the compressed video is then partitioned into first segments according to the set of classes.

The visual features are then used to partitioning each first segment into second segments using motion analysis. Summaries of the second segments can be provided to assist in the browsing of the compressed video.

DETAILED DESCRIPTION OF THE PREFERRED EMBODIMENTS

System Overview

Figure 1:
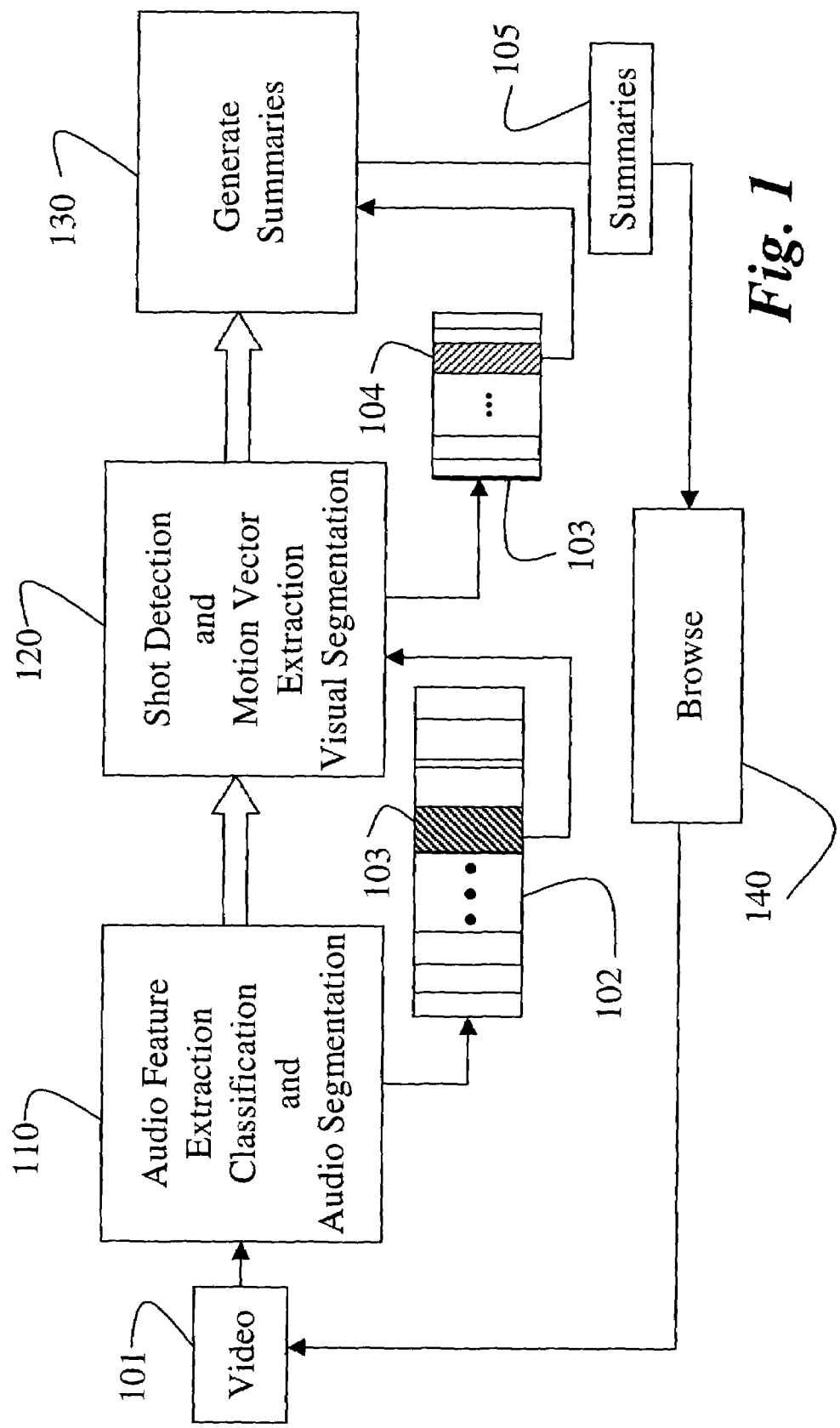
FIG. 1 is a block diagram of a video segmentation, summarizing, and browsing system according to the invention.

As shown in FIG. 1, the present invention takes as input a compressed video 101. Audio feature extraction, classification, and segmentation 110 is performed on the video to produce a segmented video 102 according to audio features. Shot detection, motion feature extraction, and visual segmentation 120 is then performed on the segments 103 to provide a second level segmentation 104 of the video 101. These segments 104 can be summarized 130 to produce summaries 105 of the video 101. The summaries 105 can then be used to efficiently browse 140 the video 101.

Audio Feature Segmentation

During step 110, the compressed video 101 is processed to extract audio features. The audio features are classified, and the video is segmented according to different classes of audio features. The processing 110 uses MPEG-7 audio descriptors to identify, for example, non-speech, and speech segments. The speech segments can than be further processed into male speech and female speech segments. The speech segments are also associated with a speech feature vector $F_S$ obtained from a histogram of state transitions.

Because the number of male and female principal cast members in a particular news program is quite small, for example, somewhere in the range of three to six, and usually less than ten, K-means clustering can be applied separately to each of the male and female segments. The clustering assigns only the K largest clusters to the cast members.

This allows one to segment the compressed video 101 at a first level according to topics so that the video can be browsed 140 by skipping over segments not of interest.

Note that by using the clustering step with the audio feature vector we manage to generate sub-classes within the classes produced by the MPEG-7 audio descriptor generation. In other words, because our approach retains both the audio feature vector and the class, it allows both further sub-classification as well as generation of new classes by joint analysis of disjoint classes generated by the MPEG-7 extraction, and further segment the video at a finer granularity. Note that this would not be possible with a fixed classifier that classifies the segments into a pre-determined set of classes as in the prior art.

Visual Feature Segmentation

Then, motion based segmentation 120 is applied to each topic, i.e., segment 103, for a second level segmentation based on visual features. Then summaries 105 can be produced based on principal cast identification and topic segmentation combined with the motion based summary of each semantic segment enables quick and effective browsing 140 of the video. It should be understood that the content of the video can be news, surveillance, entertainment, and the like, although efficacy can vary of course.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for segmenting a compressed video, comprising:
   extracting audio features directly from the compressed video, in which the audio features are MPEG-7 descriptors extracted from the compressed video;
   clustering the audio features into a set of classes;
   partitioning compressed video into first segments according to the set of classes;
   extracting visual features from the compressed video; and
   partitioning each first segment into second segments according to the visual features.

2. The method of claim 1 further comprising:
   generating a summary of each first and second segment; and
   browsing the compressed video according to first and second summaries.

3. The method of claim 1 wherein the clustering is K-means clustering.

4. The method of claim 1 wherein the classes are associated with principal cast members in the compressed video.

5. The method of claim 1 further comprising:
   identifying speech segments and non-speech segments using the audio features; and
   clustering only the speech segments.

6. The method of claim 4 further comprising:
   identifying speech segments and non-speech segments using the audio features; and
   identifying male speech segments and female speech segments in the speech segments; and
   separately clustering the male segments and the female segments to identify the principal cast members.

7. The method of claim 1 wherein the number of classes is less than ten.

8. The method of claim 1 further comprising:
   performing motion analysis on the visual features to perform the partitioning of the first segments into the second segments.

9. The method of claim 1 further comprising:
   retaining the audio features to sub-classify the classes and further partition the first segments.

10. A method for segmenting a compressed video, comprising:
    extracting MPEG-7 descriptors directly from the compressed video;
    clustering the MPEG-7 descriptors into a set of classes;
    partitioning compressed video into first segments according to the set of classes;
    extracting visual features from the compressed video; and
    partitioning each first segment into second segments according to the visual features.

* * * * *